(12) United States Patent
Alluigi et al.

(10) Patent No.: US 11,571,703 B2
(45) Date of Patent: Feb. 7, 2023

(54) TRIGGER DISPENSER

(71) Applicant: The Clorox Company, Oakland, CA (US)

(72) Inventors: Riccardo Alluigi, Alessandria (IT); Stephen R. Dennis, Danville, CA (US)

(73) Assignee: The Clorox Company, Oakland, CA (US)

( * ) Notice: Subject to any disclaimer, the term of this patent is extended or adjusted under 35 U.S.C. 154(b) by 390 days.

(21) Appl. No.: 15/925,137

(22) Filed: Mar. 19, 2018

(65) Prior Publication Data

US 2018/0207659 A1     Jul. 26, 2018

Related U.S. Application Data

(60) Division of application No. 14/523,290, filed on Oct. 24, 2014, now Pat. No. 9,919,326, which is a
(Continued)

(30) Foreign Application Priority Data

Sep. 16, 2010  (WO) .................. BS2010A000155

(51) Int. Cl.
    *B05B 11/00*    (2006.01)
    *G01F 11/02*    (2006.01)
    (Continued)

(52) U.S. Cl.
    CPC ...... *B05B 11/0044* (2018.08); *B05B 11/3002* (2013.01); *B05B 11/3011* (2013.01);
    (Continued)

(58) Field of Classification Search
    CPC ............ B05B 11/0044; B05B 11/3011; B05B 11/3016; B05B 15/30; B05B 11/3002;
    (Continued)

(56) References Cited

U.S. PATENT DOCUMENTS 3,575,949 A   4/1971 Humphrey et al.
4,101,041 A   7/1978 Mauro, Jr. et al.
(Continued)

FOREIGN PATENT DOCUMENTS

DE    83 11 429 U1   9/1983
EP    0 202 464 A1   11/1986
(Continued)

OTHER PUBLICATIONS

International Preliminary Report on Patentability for PCT/IB2011/051496 dated Sep. 28, 2012.
(Continued)

*Primary Examiner* — Patrick M. Buechner
(74) *Attorney, Agent, or Firm* — Harness, Dickey & Pierce, P.L.C.

(57) ABSTRACT

A trigger dispenser device (1) envisages a secondary liquid aspiration duct (50) in communication with the dispenser duct, and a primary liquid aspiration duct (8) in communication with the container, off-axis with each other. Between these, a joining compartment (64) is provided communicating upstream with the primary liquid aspiration duct (8) and communicating downstream with the secondary liquid aspiration duct (50) to form the fluidic connection between them. In particular, the container (C) is of the type with built-in suction pipe.

18 Claims, 8 Drawing Sheets

Related U.S. Application Data continuation of application No. 13/821,685, filed as application No. PCT/IB2011/051496 on Apr. 7, 2011, now Pat. No. 8,870,033.

(51) Int. Cl.
- *B05B 15/30* (2018.01)
- *B05B 15/652* (2018.01)

(52) U.S. Cl.
CPC ...... *B05B 11/3016* (2013.01); *B05B 11/3069* (2013.01); *B05B 15/30* (2018.02); *G01F 11/028* (2013.01); *B05B 11/0037* (2013.01); *B05B 11/0067* (2013.01); *B05B 11/3045* (2013.01); *B05B 15/652* (2018.02)

(58) Field of Classification Search
CPC ............... B05B 11/3069; B05B 15/652; B05B 11/0037; B05B 11/0067; B05B 11/3045; G01F 11/028
USPC ............................................ 222/383.1, 321.8
See application file for complete search history.

(56) References Cited

U.S. PATENT DOCUMENTS

| | | | | |
|---|---|---|---|---|
| 4,157,774 | A | 6/1979 | Micallef | |
| 4,174,056 | A * | 11/1979 | Loeffler | B05B 11/3004 222/321.7 |
| 4,191,313 | A | 3/1980 | Blake et al. | |
| 4,527,741 | A * | 7/1985 | Garneau | B05B 11/00 222/383.1 |
| 4,600,130 | A | 7/1986 | Libit | |
| 4,640,444 | A * | 2/1987 | Bundschuh | B05B 1/3431 222/321.7 |
| 4,646,969 | A * | 3/1987 | Sorm | B05B 11/3088 222/321.8 |
| 4,669,664 | A * | 6/1987 | Garneau | B05B 11/007 137/853 |
| 4,819,835 | A * | 4/1989 | Tasaki | B05B 11/3011 222/383.1 |
| 4,863,071 | A | 9/1989 | Guss et al. | |
| 4,911,361 | A | 3/1990 | Tada | |
| RE33,480 | E | 12/1990 | Guss et al. | |
| 5,192,007 | A | 3/1993 | Blomquist | |
| 5,244,126 | A | 9/1993 | Geier | |
| 5,246,146 | A | 9/1993 | Bartimes et al. | |
| 5,297,701 | A | 3/1994 | Steijns et al. | |
| 5,303,851 | A | 4/1994 | Libit et al. | |
| 5,335,821 | A | 8/1994 | Osgar | |
| 5,433,350 | A | 7/1995 | Graubart | |
| 5,439,141 | A | 8/1995 | Clark et al. | |
| 5,464,129 | A | 11/1995 | Ho | |
| 5,464,130 | A * | 11/1995 | Tasaki | B05B 11/3011 222/383.1 |
| 5,540,360 | A | 7/1996 | Foster et al. | |
| 5,590,815 | A | 1/1997 | Montaner et al. | |
| 5,590,834 | A * | 1/1997 | Foster | B05B 11/0005 239/333 |
| 5,638,994 | A | 6/1997 | Libit et al. | |
| 5,667,104 | A | 9/1997 | Meshberg | |
| 5,709,325 | A | 1/1998 | Renault et al. | |
| 5,711,457 | A * | 1/1998 | Wanbaugh | B05B 11/3085 222/136 |
| 5,887,763 | A | 3/1999 | Foster | |
| 5,906,301 | A | 5/1999 | Foster | |
| 6,032,814 | A | 3/2000 | Foster | |
| 6,095,377 | A | 8/2000 | Sweeton et al. | |
| 6,102,255 | A | 8/2000 | Ellion | |
| 6,116,472 | A | 9/2000 | Wanbaugh et al. | |
| 6,213,358 | B1 | 4/2001 | Libit et al. | |
| 6,364,172 | B1 | 4/2002 | Maas et al. | |
| 6,378,739 | B1 | 4/2002 | Maas et al. | |
| 6,543,654 | B1 | 4/2003 | Uhl et al. | |
| 6,659,311 | B2 | 12/2003 | Prueter | |
| 6,669,061 | B2 | 12/2003 | Tada | |
| 6,789,303 | B2 | 9/2004 | Maas et al. | |
| 7,455,198 | B2 | 11/2008 | Foster et al. | |
| 7,490,743 | B2 | 2/2009 | Herzog | |
| 7,497,358 | B2 | 3/2009 | Clynes et al. | |
| 7,571,836 | B2 | 8/2009 | Foster et al. | |
| 7,637,396 | B2 | 12/2009 | Foster et al. | |
| 7,712,636 | B2 | 5/2010 | Foster et al. | |
| 7,938,299 | B2 | 5/2011 | Fahy et al. | |
| 8,038,040 | B2 | 10/2011 | Dennis | |
| 8,066,155 | B2 | 11/2011 | Tada | |
| 8,074,826 | B2 | 12/2011 | Cronin et al. | |
| 8,074,846 | B2 | 12/2011 | Allegaert | |
| 8,245,887 | B2 | 8/2012 | Ohshima | |
| 8,408,429 | B2 | 4/2013 | Dennis | |
| 8,800,822 | B2 | 8/2014 | Good et al. | |
| 8,870,033 | B2 | 10/2014 | Alluigi et al. | |
| 8,931,668 | B2 | 1/2015 | Alluigi et al. | |
| 9,132,441 | B2 * | 9/2015 | Hoffman | B05B 11/3011 |
| 9,211,557 | B2 * | 12/2015 | Syson | B05B 11/3042 |
| D750,333 | S | 2/2016 | Kane | |
| 9,302,284 | B2 * | 4/2016 | Alluigi | B05B 11/3019 |
| 9,339,830 | B2 | 5/2016 | De Roo | |
| 9,387,500 | B2 | 7/2016 | Good et al. | |
| 9,827,581 | B2 | 11/2017 | Good et al. | |
| 9,919,326 | B2 | 3/2018 | Alluigi et al. | |
| 10,124,357 | B2 | 11/2018 | Good et al. | |
| 2002/0066802 | A1 | 6/2002 | Tada | |
| 2006/0086759 | A1 | 4/2006 | Herzog | |
| 2006/0086762 | A1 | 4/2006 | Foster et al. | |
| 2006/0086763 | A1 * | 4/2006 | Foster | B05B 11/3074 222/383.1 |
| 2006/0086782 | A1 | 4/2006 | VanTrieste | |
| 2006/0289679 | A1 | 12/2006 | Johnson et al. | |
| 2007/0290005 | A1 | 12/2007 | Foster et al. | |
| 2007/0295757 | A1 | 12/2007 | Foster et al. | |
| 2008/0116222 | A1 * | 5/2008 | Alluigi | B05B 11/0032 222/153.13 |
| 2008/0121664 | A1 | 5/2008 | Ophardt et al. | |
| 2009/0212077 | A1 | 8/2009 | Carden | |
| 2010/0096414 | A1 | 4/2010 | Dennis | |
| 2010/0096415 | A1 | 4/2010 | Dennis | |
| 2011/0036927 | A1 | 2/2011 | Hensen | |
| 2011/0049191 | A1 | 3/2011 | Crawford et al. | |
| 2011/0108447 | A1 | 5/2011 | Hoefing et al. | |
| 2011/0108581 | A1 | 5/2011 | Dennis | |
| 2011/0121039 | A1 | 5/2011 | Dennis | |
| 2011/0163184 | A1 | 7/2011 | Dennis | |
| 2012/0006856 | A1 | 1/2012 | Dennis | |
| 2012/0018458 | A1 | 1/2012 | Chernik et al. | |
| 2012/0234870 | A1 | 9/2012 | Good et al. | |
| 2012/0234871 | A1 | 9/2012 | Good et al. | |
| 2012/0234872 | A1 | 9/2012 | Good et al. | |
| 2013/0026192 | A1 * | 1/2013 | Alluigi | B05B 11/0064 222/335 |
| 2013/0161359 | A1 | 6/2013 | Alluigi et al. | |
| 2013/0256339 | A1 | 10/2013 | Alluigi et al. | |
| 2014/0367423 | A1 | 12/2014 | Good et al. | |
| 2016/0059254 | A1 | 3/2016 | De Roo | |
| 2016/0318052 | A1 | 11/2016 | DeJong et al. | |
| 2017/0304856 | A1 | 10/2017 | Alluigi et al. | |
| 2018/0043383 | A1 | 2/2018 | Good et al. | |
| 2021/0362175 | A1 * | 11/2021 | Nakamura | B05B 11/3097 |

FOREIGN PATENT DOCUMENTS

| | | |
|---|---|---|
| EP | 2 020 264 A2 | 2/2009 |
| WO | 2011/020009 A1 | 2/2011 |
| WO | 2012035445 A1 | 3/2012 |
| WO | 2015068065 A1 | 5/2015 |

OTHER PUBLICATIONS

International Search Report for PCT/IB2011/051496 dated Aug. 2, 2011.

(56) References Cited

OTHER PUBLICATIONS

International Search Report dated Oct. 1, 2012 in International Application No. PCT/US2012/029468.

* cited by examiner

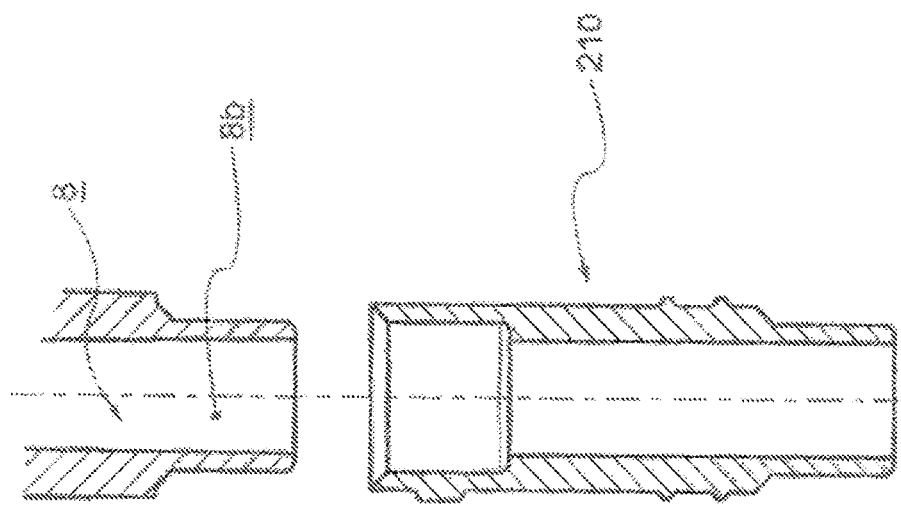
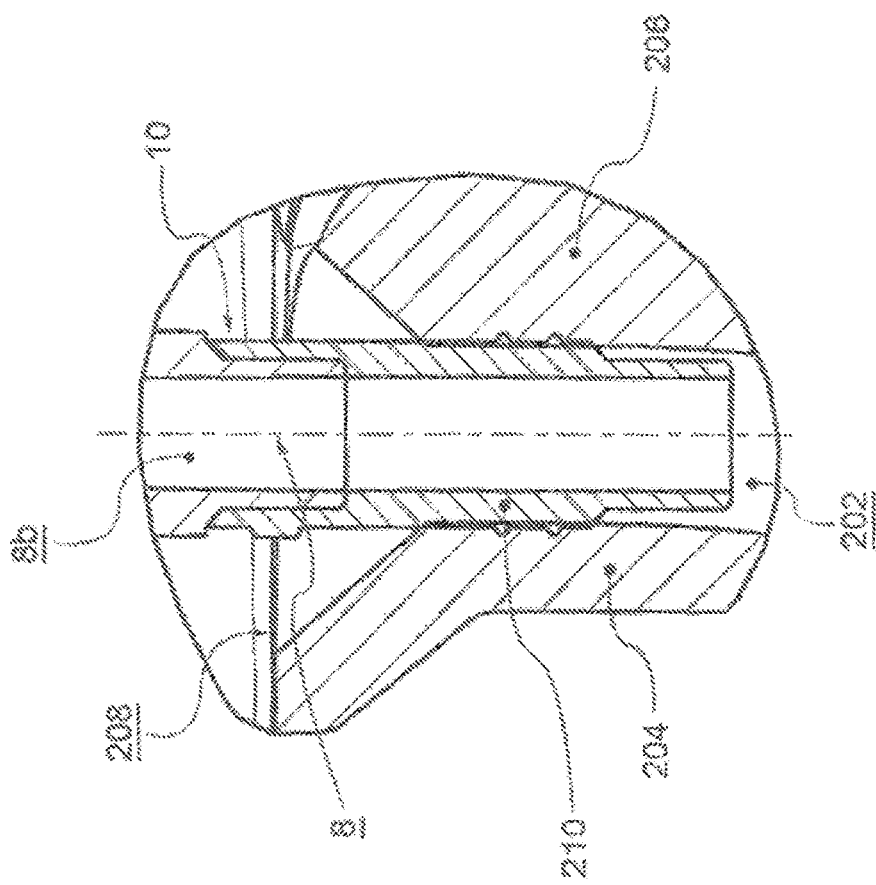
FIG. 4
FIG. 5

TRIGGER DISPENSER

CROSS-REFERENCE TO RELATED APPLICATIONS

This application is a divisional of U.S. patent application Ser. No. 14/523,290 filed on Oct. 24, 2014, which is a continuation of U.S. patent application Ser. No. 13/821,685 filed on Mar. 8, 2013, now U.S. Pat. No. 8,870,033 issued on Oct. 28, 2014, which claims benefit of International Patent Application No. PCT/IB2011/051496 filed on Apr. 7, 2011, which claims benefit of Italian Patent Application No. BS2010A000155 filed on Sep. 16, 2010. The entire disclosures of the above applications are incorporated herein by reference.

FIELD

The present disclosure relates to a manually operated dispenser device of a liquid, generally trigger-operated.

BACKGROUND

This section provides background information related to the present disclosure which is not necessarily prior art.

Such dispenser devices, known as in the trade "trigger pumps", are extremely widespread, with an annual production of several hundred million pieces. They are in fact widely used in the household cleaning sector, for treating fabrics and in the world of hobbies etc.

For the production of such devices to economically worthwhile, the plants need to be able to produce and assemble an extremely large number of pieces. Consequently, even slight improvements to the production process of the components and in the assembly process of the same may entail significant economic benefits.

In particular, it is essential that the device is easy to assemble even when it has internal components which are asymmetric or off axis.

All this must necessarily marry with increasingly restrictive requirements regarding functionality of the devices, reliability and the type of jet dispensed.

SUMMARY

This section provides a general summary of the disclosure, and is not a comprehensive disclosure of its full scope or all of its features.

The purpose of the present invention is to realise a manually operated dispenser device of a liquid, in particular trigger-operated, which satisfies the aforesaid requirements.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4 shows an enlargement of the detail IV in FIG. 3;

FIG. 5 shows the detail of FIG. 4, in separate parts;

Corresponding reference numerals indicate corresponding parts throughout the several views of the drawings.

DETAILED DESCRIPTION

Figure 1:
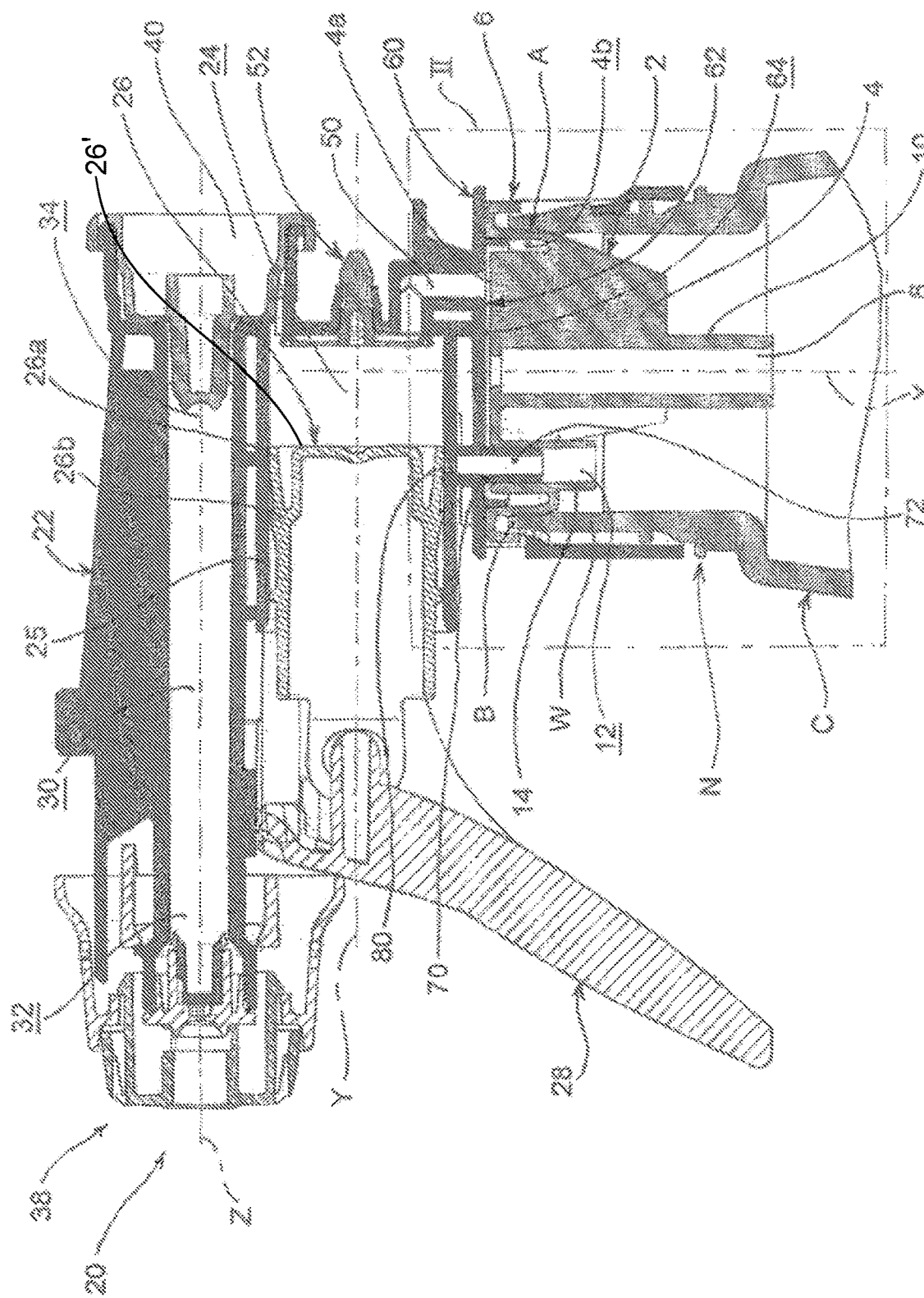
FIG. 1 shows a cross-section view of the dispenser device according to the present invention, according to a first embodiment.

Example embodiments will now be described more fully with reference to the accompanying drawings.

With reference to the appended drawings, reference numeral 1 globally denotes a manually operated dispenser device of a liquid.

The dispenser device comprises a container C to contain the liquid to be dispensed, comprising a neck N made by an annular wall W around a container axis X, which defines by means of an annular rim B, a container aperture A for access to the inside of the same.

The dispenser device 1 comprises a dispenser head 20 attached to the container C to manually aspirate the liquid from the container and dispense it to the outside.

The head 20 is pre-assembled and in general sent for filling of the container separately from it. After filling the container with liquid, the head is coupled to the container.

The head 20 further comprises an auxiliary body 2 attached to the neck N of the container C, at the aperture A of the same, to close it peripherally forming a seal.

In particular, the auxiliary body 2 comprises a main portion 4, inserted through the aperture A in the neck N, provided with a main surface 4a which remains external, and an annular collar 6, overlapping the annular rim B of the neck N, for example folded so as to straddle said annular rim B.

Preferably, the auxiliary body 2 has, on the outer side, an annular groove 4b which surrounds the main surface 4a.

The auxiliary body 2 has a primary liquid aspiration duct 8 extending along the container axis X; coaxial to said container axis X.

In one embodiment variation, the primary liquid aspiration duct 8 is eccentric to the container axis X, that is radially distanced from it.

The primary liquid aspiration duct 8 passes through the thickness of the main portion 4, placing the compartment inside the container in communication with the main surface 4a.

In particular, preferably, the primary liquid aspiration duct 8 is defined through a first tube 10, coaxial to the container axis X.

Preferably, a flexible or rigid suction tube is connectable to the tube 10, which extends as far as the bottom of the container, to suck up the liquid.

Moreover, the auxiliary body 2 has a primary air aspiration duct 12, radially distanced from the primary liquid aspiration duct 8, passing through the thickness of the main portion 4, to place the outer environment or main surface 4a in communication with the compartment inside the container.

In particular, preferably, the primary air aspiration duct 12 is defined through a second tube 14, radially distanced from the first tube 10.

Moreover, the head 20 comprises a frame 22 to support the other components and form some passages for the liquid. The auxiliary body 2 is attached to the frame 22.

The frame 22 has a pressure chamber 24, annularly defined by a chamber wall 25, extending along a pressure axis Y, preferably incident to the container axis X, for example orthogonally.

The head 20 comprises a piston 26, sealingly sliding in the pressure chamber 24 along the pressure axis Y, between a rest position 26'(for example illustrated in FIGS. 1, 1A and 1C), wherein the volume of the pressure chamber 24 is maximum, and a limit dispensing position 26"(for example illustrated in FIG. 1B), wherein the volume of the pressure chamber 24 is minimal, passing through intermediate dispensing positions.

Preferably, the piston 26 comprises a head seal 26a and a tail seal 26b, distanced from the head seal along the pressure axis Y, for tightness between the piston and the chamber wall 25 in which it slides.

The head 20 further comprises manual actuation devices suitable to move the piston 26 manually in the pressure chamber 24.

Preferably, the actuation means comprise a trigger 28, suitable to act on the piston 26, for example anchored to it, and engaged with the frame 22, for example hinged so as to rotate with it or sliding in translation on it.

Preferably, moreover, the head 20 comprises elastic return means able to permanently influence the piston 26 or trigger 28 to return the piston 26 to the rest position.

The frame 22 further presents a dispenser duct 30 extending along a dispensing axis Z, between a distal extremity 32, at the aperture towards the outside, and an opposite proximal extremity 34.

Preferably, the pressure axis Y is parallel and separate from the dispenser axis Z.

The head 20 further comprises, preferably, a nozzle 38, attached to the distal extremity 32 of the dispenser duct 30, to enable dispensing of the liquid in the desired manner.

The pressure chamber 24 is suitable for being placed in fluidic communication with the dispenser duct 30.

Figure 1A:
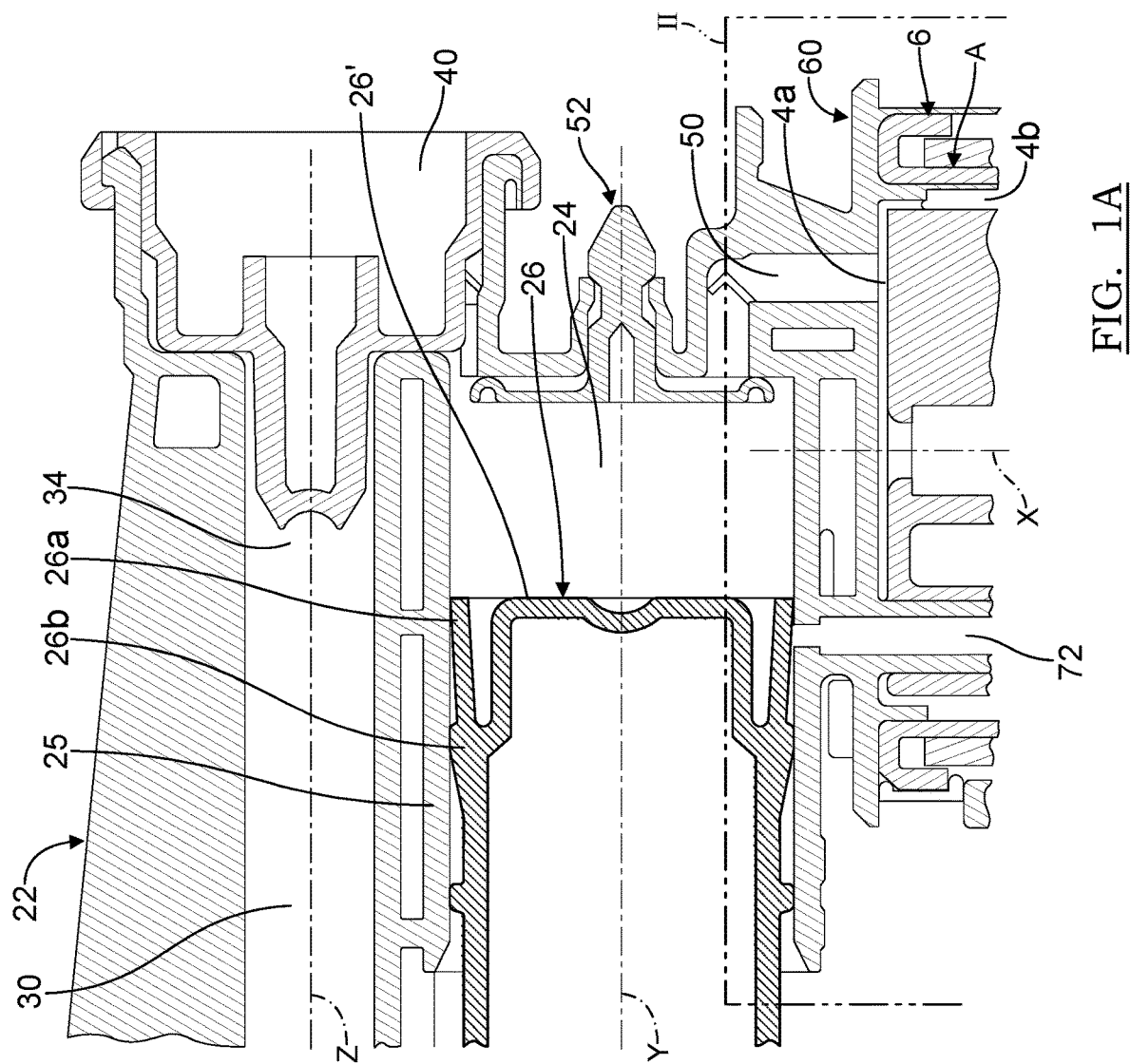
FIG. 1A shows an enlargement of the area II in FIG. 1, in a selected position.
Figure 1B:
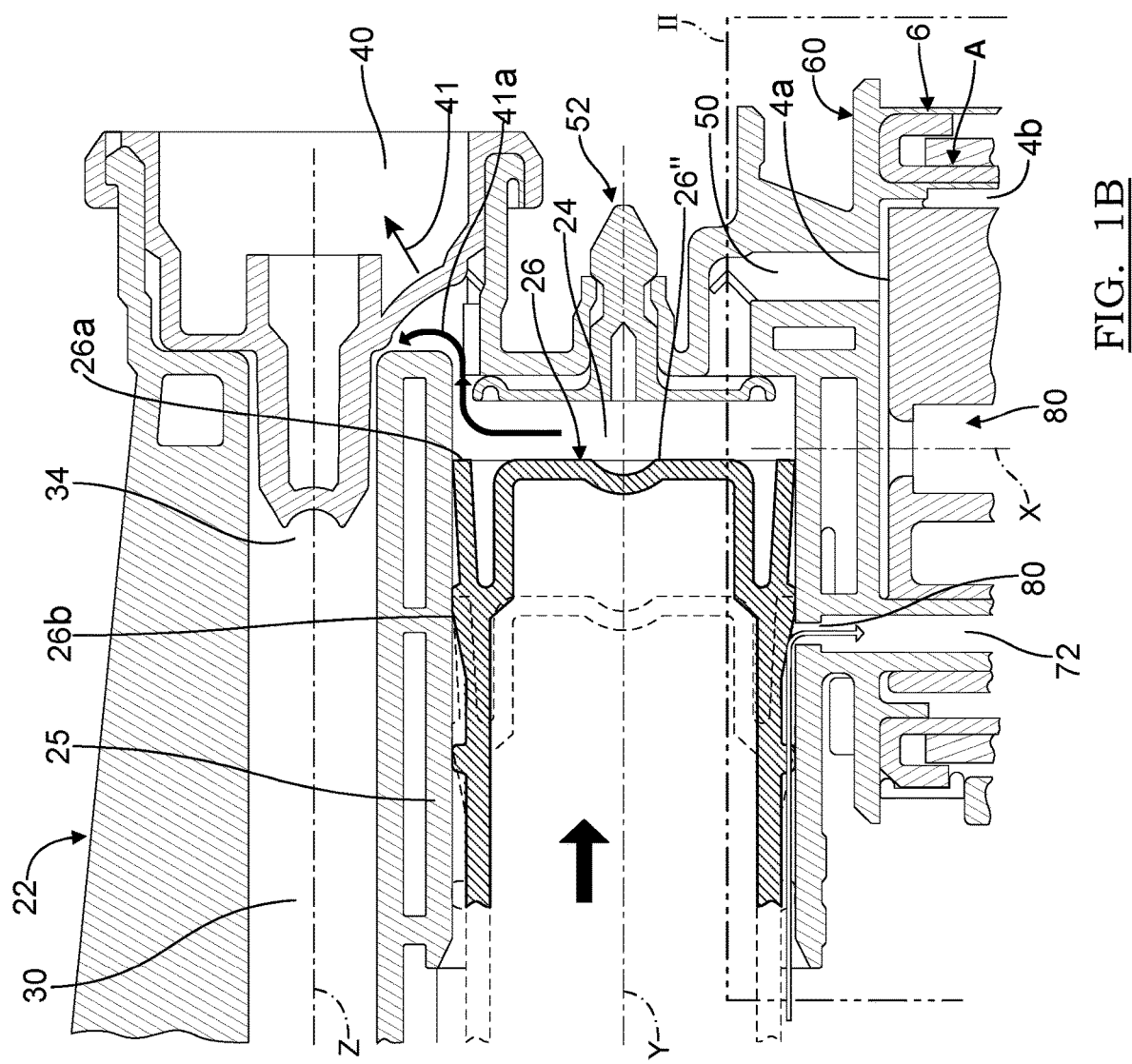
FIG. 1B shows an enlargement of the area II in FIG. 1, in a selected position.
Figure 1C:
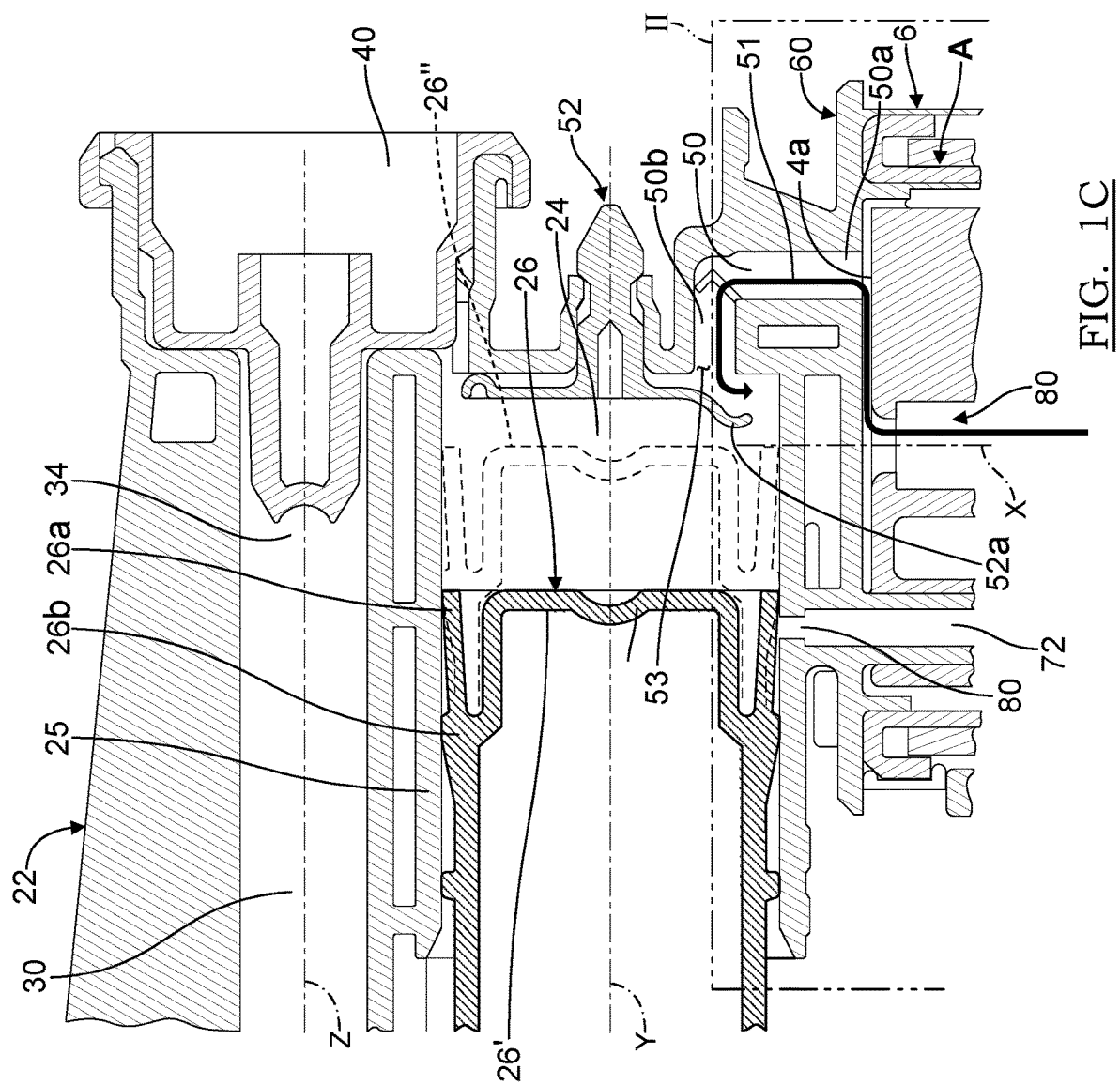
FIG. 1C shows an enlargement of the area II in FIG. 1, in a selected position.

In particular, with reference to FIGS. 1A, 1B, and 1C, the head 20 comprises valve dispenser means suitable for allowing the transit of liquid from the pressure chamber 24 to the dispenser duct 30 when, during the dispensing phase, the piston 26 moves from the rest position, as illustrated in FIG. 1A towards the dispenser limit position, as illustrated in FIG. 1B and the liquid exceeds a predefined pressure threshold.

For example, the valve dispenser means comprise an elastically deformable diaphragm 40, attached to the frame 22, that may deflect in the direction of arrow 41 as the liquid exceeds the predefined pressure threshold and generally flows in the direction of arrow 41a.

Moreover, the frame 22 has a secondary liquid aspiration duct 50, which co-operates in the connection of the pressure chamber 24 with the compartment inside the container.

Figure 2:
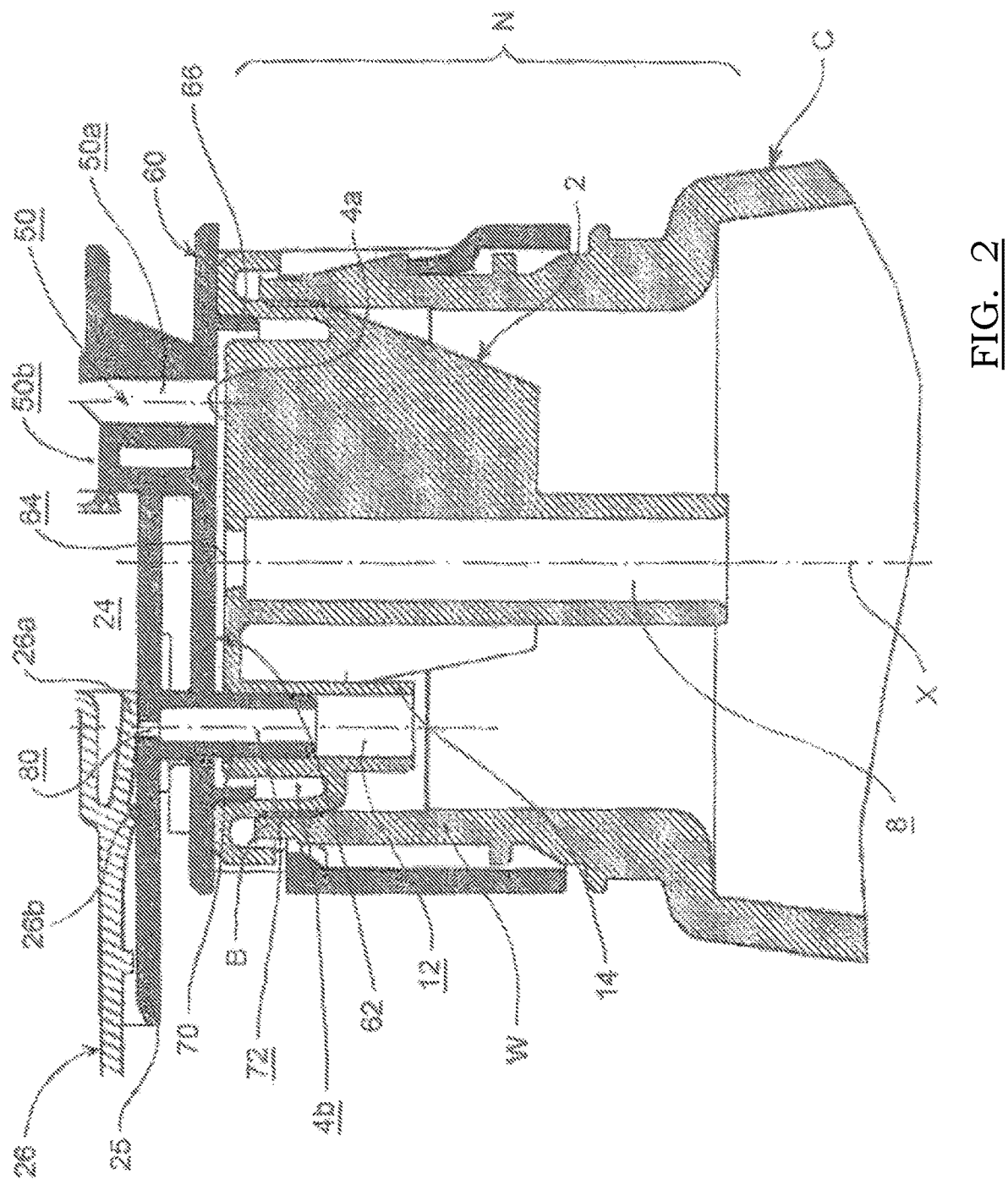
FIG. 2 shows an enlargement of the area II in FIG. 1.
Figure 3:
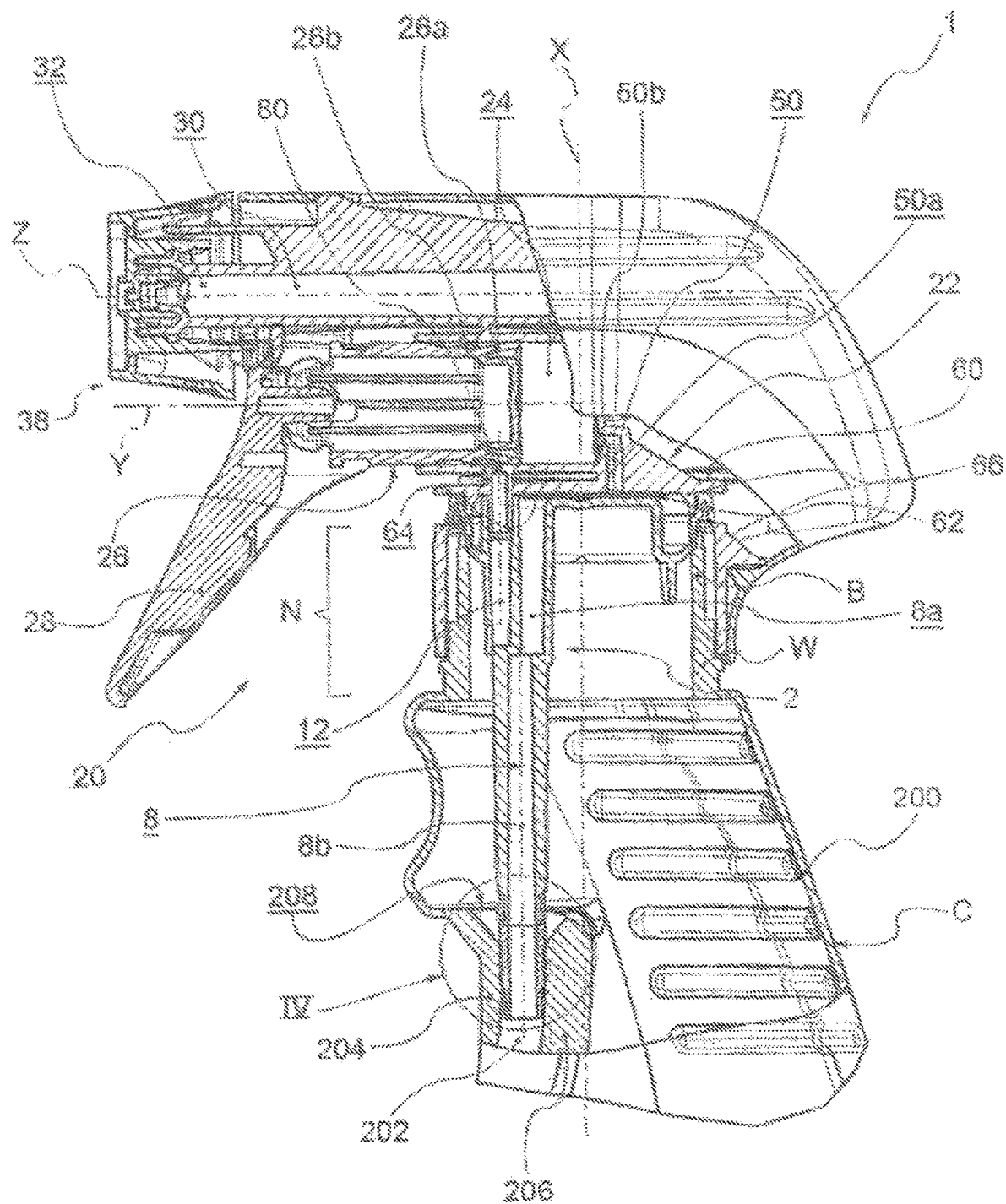
FIG. 3 shows a cross-section view of a dispenser device according to the present invention, according to a further embodiment.
Figure 6:
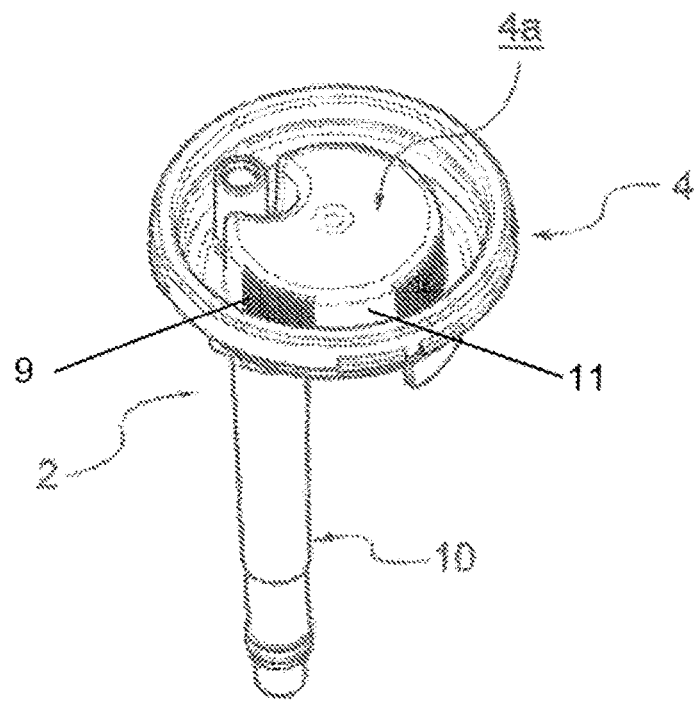
FIG. 6 shows an auxiliary body of the device in FIG. 3.
Figure 7:
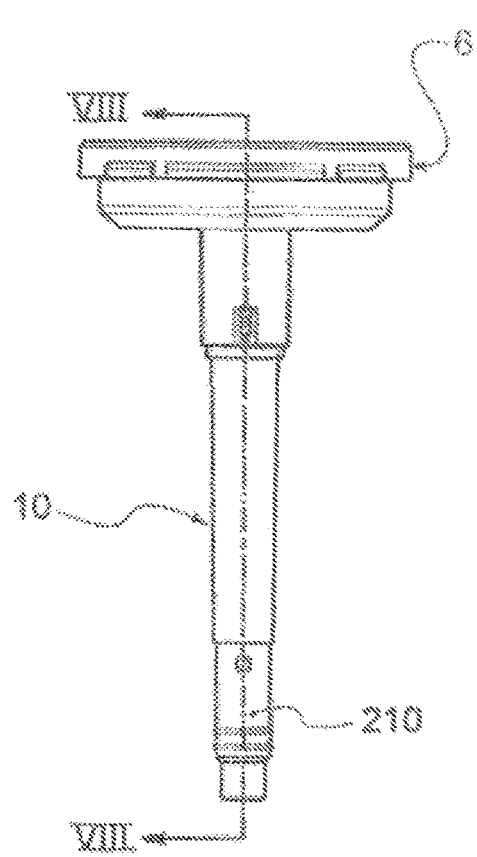
FIG. 7 shows a front view of the auxiliary body in FIG. 6.
Figure 8:
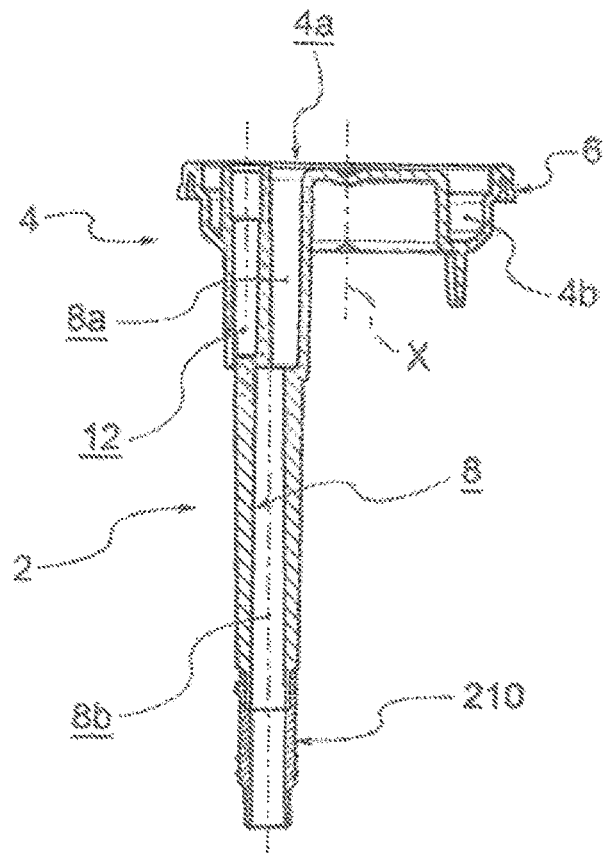
FIG. 8 shows a cross-section view of the auxiliary body in FIG. 7, taken along the section line VIII in FIG. 7.

With reference to FIG. 1C and FIG. 2, the secondary liquid aspiration duct 50 comprises an axial section 50a, extending parallel to the container axis X, and a radial section 50b, extending parallel to the pressure axis Y of the pressure chamber 24. Following the movement of the liquid aspirated from the container towards the pressure chamber generally in the direction of arrow 51, the axial section 50a is upstream of the radial section 50b.

Moreover, for example with reference to FIG. 1C, the head 20 comprises valve dispenser means suitable for allowing the transit of liquid from the secondary aspiration duct 50 towards the pressure chamber 24 generally in the direction of arrow 51 when, during a return phase, the piston 26 moves towards the rest position 26'from the dispenser limit position 26"illustrated in phantom), and prevents transit of the liquid from the pressure chamber 24 towards the secondary liquid aspiration duct 50 during said dispensing phase.

Preferably, said valve aspiration means comprise an elastically deformable aspiration diaphragm 52, fitted between the pressure chamber 24 and the secondary liquid aspiration duct 50, having a portion 52a moveable away from an opening 53 of the secondary liquid aspiration duct 50 during said return phase to allow the transit of liquid from the secondary aspiration duct 50 towards the pressure chamber 24.

The frame 22 comprises a support plate 60, by means of which the frame 22 engages with the auxiliary body 2. The plate 60 has a functional surface 62 on the outside, which the secondary liquid aspiration duct 50 comes out on, in a radially distanced position from the container axis X that is at least partially misaligned from the primary liquid aspiration duct 8.

Preferably the secondary liquid aspiration duct 50, and in particular the axial section 50a of the same, is on the opposite side to the secondary air aspiration duct 72 in relation to the container axis X.

When the head 20 is attached to the container, the functional surface 62 of the frame 22 is axially distanced from the main surface 4a of the auxiliary body 2, so that a joining compartment or duct 64 is formed between these, which connects the main liquid aspiration duct 8 of the auxiliary body 2 with the secondary liquid aspiration duct 50 of the frame 22.

The primary liquid aspiration duct 8, the joining compartment 64 and the secondary liquid aspiration duct 50 thereby form a liquid aspiration passage which places the compartment inside the container in communication with the pressure chamber 24 of the head 20.

Moreover, preferably, the frame 22 comprises an annular lip 66, projecting in the direction of the container axis X from the functional surface 62 of the plate 60, inserted in the groove 4b of the auxiliary body 2, to form a seal.

Moreover, the frame 22 comprises a tubular aspiration insert 70, projecting from the functional surface 62 and inserted so as to form a seal in the aspiration tube 14 of the auxiliary body 2, defining within it a secondary air aspiration duct 72. The insert 70 therefore crosses the joining compartment 64 destined for transit of the liquid.

The primary air aspiration duct 12 and the secondary air aspiration duct 72 are therefore in communication with each other and form a separate air, aspiration passage sealed from the liquid aspiration passage.

In particular, the secondary air aspiration duct 72 comprises an aspiration hole 80 made through the chamber wall 25.

Preferably, when the piston 26 is in the rest position, the hole 80 is separated from the pressure chamber 24 by the head seal 26a of the piston 26 and is separated from the outside environment by the tail seal 26b of the piston 26; when the piston 26 is in the dispensing limit position, the hole 80 is in communication with the outside environment, but is separated from the pressure chamber 24 by the tail seal 26b (and by the head seal 26a).

In an initial rest configuration, the piston 26 is in the rest position, the valve dispenser means are closed, the valve aspiration means are closed, the air aspiration passage towards the outside is closed; the presence of liquid to dispense in the pressure chamber 24 is presumed.

In the dispensing phase, the piston 26 completes a dispensing stroke from the rest position to the limit dispensing position by manual activation of the trigger 28.

By effect of the liquid in the pressure chamber 24, the liquid aspiration valve means remain closed, preventing the backflow of liquid towards the container.

By effect of the pressurised liquid, the valve dispenser means open, making the liquid travel from the pressure chamber 24 to the dispenser duct 30, thereby enabling dispensing from the nozzle 38.

When the trigger is released, the elastic return means move the piston 26 or the trigger 28 from the dispensing limit position towards the rest position.

In the return phase, the piston 26 performs a return stroke from the dispensing limit position towards the return position.

The negative pressure which is formed in the pressure chamber 24 closes the dispenser valve means. The negative pressure which is formed in the pressure chamber 24 opens the liquid aspiration valve means and the liquid transits from the compartment inside the container into the pressure chamber 24, through the primary liquid aspiration duct 8, the joining compartment 64 and the secondary liquid aspiration duct 50.

At least for a part of the return phase, the air aspiration passage is in communication with the outside environment, so that the air can be aspirated into the compartment inside the container, as illustrated in FIG. 1B.

The air aspiration passage, and in particular the secondary air aspiration duct 72, is fluidically separated from the liquid aspiration passage, and in particular from the joining compartment 64, so that there is no leakage of liquid.

According to a further embodiment, the container C comprises an annular container wall 200 around the container axis X and an auxiliary liquid aspiration duct 202, made entirely in said lateral wall of the container C.

In other words, the container wall 200 comprises a portion of functional wall 204, for example positioned head-on with the container, that is on the side destined for the liquid to come out, and an auxiliary wall 206, in one piece with the container wall 200, inside the container C, which runs along the portion of functional wall 204, so as to form with it the auxiliary liquid aspiration duct 202.

Said duct 202 is open near the bottom of the container, to aspirate the liquid contained in it.

Preferably, said duct 202 starts from an engagement mouth 208, axially distanced from the neck N of the container C.

The primary liquid aspiration duct 8, at least partially eccentric to the container axis X, is suitable for inserting in the engagement mouth 208 of the auxiliary liquid aspiration duct 202.

For example, advantageously, the primary liquid aspiration duct 8 comprises a first section 8a, which starts from the main surface 4a, having a first duct axis proximal to the container axis X and a second section 8b, adjacent to the first section 8a and terminating in the engagement mouth 208, distal to the container axis X. The main surface 4a is surrounded by annular groove 4b that has a plurality of vertically extending regions 9 extending along a wall 11 of the annular groove 4b.

Preferably, moreover, the primary liquid aspiration duct 8 comprises, in the terminal part suitable for insertion in the engagement mouth 208, a flexible coupling portion 210, made in a less rigid material than the material of the remaining part of the primary liquid aspiration duct 8.

Preferably, the flexible coupling portion 210 is made in one piece with the remaining part of the duct 8, for example by means of a co-moulding process.

For example, the flexible coupling portion 210 is made in Ethylene-Vinyl-Acetate (EVA) or in a material from the group of thermoplastic elastomers (TPE); the remaining part of the tube is rather made preferably made from high density polyethylene (PEND).

Advantageously, this makes insertion of the duct 8 in the engagement mouth 208 particularly easy.

Preferably, moreover, the primary liquid aspiration duct 8 and the secondary liquid aspiration duct 50 are positioned on diametrically opposite sides the container axis X. In particular, for example, the first section 8a of the primary liquid aspiration duct 8 is completely contained on one side of the container axis X and the axial section 50a of the secondary liquid aspiration duct 50 is completely contained on the other side.

Innovatively, the dispenser device according to the present invention, despite having asymmetric components and off-axis ducts, retains considerable assembly simplicity.

In particular, advantageously, the head ensures a good seal with the container, thanks to the interposition of the auxiliary body between the frame and neck, of the container, made in particularly suitable material for forming a seal with the neck of the container.

Moreover, advantageously, the head ensures a good internal seal between the frame and auxiliary body, made in materials suitable for such purpose.

Advantageously, moreover, the dispenser device ensures aspiration of the air in the container preventing the leakage of liquid in said duct.

According to a further advantageous aspect, the dispenser device ensures aspiration of the air in the container preventing liquid from escaping from the air aspiration passage, for example when the device is inclined.

In particular, according to a further advantageous aspect, the connection system of the head and container is particularly suitable in the case of containers with liquid aspiration ducts built-in to the container, for which the built-in duct is strongly off-axis with the aspiration duct of the frame and therefore needs an intermediate fluidic connection structure.

It is clear that a person skilled in the art may make modifications to the dispenser device described above so as to satisfy contingent requirements, all contained within the sphere of protection as defined by the appended claims.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for dispensing a liquid from a container, comprising:
   positioning a piston in a pressure chamber having a liquid in a rest position, wherein in the rest position an aspiration hole is separated from the pressure chamber with a first seal of the piston and separated from an outside environment exterior to the container with a second seal of the piston and a first liquid valve is closed, wherein the pressure chamber defines a pressure axis;
   providing a trigger to be actuated to move the piston to a dispensing position, wherein the aspiration hole is separated from the pressure chamber and the first liquid valve is opened to deliver the liquid from the pressure chamber to a dispenser duct to enable dispensing of the liquid through a nozzle, wherein the dispenser duct defines a dispensing axis;
   providing the trigger to be released and the piston moves to the rest position, wherein upon releasing the trigger and the piston moving to the rest position a negative pressure is formed in the pressure chamber and at least one of (i) the first liquid valve closes, (ii) a second liquid valve opens to allow a liquid from the container to be moved into the pressure chamber, and (iii) allows the aspiration hole to be in communication with the outside environment so that air from the outside environment can be aspirated into the container; and
   providing the pressure axis to be parallel and separate from the dispensing axis;
   wherein the second liquid valve is formed about the pressure axis and the first liquid valve is formed about the dispensing axis,
   wherein releasing the trigger further comprises aspirating air into the container from the aspiration hole through a secondary air aspiration duct that is sealed relative to a primary air aspiration duct directed into the container.

2. The method of claim 1, wherein the first liquid valve is a first diaphragm and the second liquid valve is a second diaphragm, wherein the first and second diaphragms open and close during actuation of the trigger.

3. The method of claim 1, wherein upon actuating the trigger, the piston slides sealingly along the pressure axis of the pressure chamber and the liquid is dispensed through the nozzle along the dispensing axis of the dispenser duct, wherein the dispensing axis and the pressure axis are substantially parallel to one another.

4. The method of claim 1, wherein the piston is movable in the pressure chamber between the initial rest position where a volume in the pressure chamber is maximum to the dispensing position where the volume of the pressure chamber is minimum.

5. The method of claim 1, wherein upon actuating the trigger to position the piston in the dispensing position, the second liquid valve remains closed to prevent the backflow of liquid toward the container.

6. The method of claim 1, wherein upon releasing the trigger, the aspiration hole is in communication with the outside environment for at least part of a return phase of the piston to the rest position.

7. The method of claim 1, wherein releasing the trigger further comprises delivering the liquid from the container through a primary liquid aspiration duct in an auxiliary body to a secondary liquid aspiration duct in communication with the pressure chamber through a joining compartment joining the primary and secondary liquid aspiration ducts that are axially offset.

8. The method of claim 7, wherein releasing the trigger further comprises delivering the liquid from the container having a container axis through the primary liquid aspiration duct positioned on one side of the container axis to the secondary liquid aspiration duct positioned on an opposite side of the container axis through the joining compartment that crosses the container axis.

9. The method of claim 7, wherein upon releasing the trigger, the negative pressure formed in the pressure chamber closes the first liquid valve disposed over an opening in the dispenser duct and opens the second liquid valve disposed over an opening in the pressure chamber and adjacent the secondary liquid aspiration duct.

10. The method of claim 7, wherein releasing the trigger further comprises delivering the liquid from the container through an auxiliary liquid aspiration duct formed in the container into the primary liquid aspiration duct to the secondary liquid aspiration duct through the joining compartment.

11. The method of claim 10, wherein releasing the trigger further comprises delivering the liquid from the auxiliary liquid aspiration duct in the container through a flexible coupling portion of the primary liquid aspiration duct that is received in the auxiliary liquid aspiration duct to the secondary liquid aspiration duct through the joining compartment.

12. A method for dispensing a liquid from a container having a piston coupled to a trigger and positioned in a pressure chamber, comprising:
   providing the trigger to slidably move the piston along a pressure axis in the pressure chamber to a dispensing position from a rest position, wherein liquid in the pressure chamber becomes pressurized to open a first liquid valve to deliver the liquid to a dispenser duct to dispense the liquid through a nozzle along a dispensing axis;
   providing the trigger to slidably return the piston along the pressure axis in the pressure chamber to the rest position, wherein negative pressure formed in the pressure chamber upon releasing the trigger closes the first liquid valve and opens a second liquid valve to deliver liquid from the container along a fill path into the pressure chamber;
   providing the fill path of the liquid from the container to the pressure chamber to include a first duct along a first duct axis in an auxiliary body and a second duct along a second duct axis between the auxiliary body and a main body, wherein the first duct axis is perpendicular to the second duct axis; and
   providing the pressure axis and the dispensing axis to be parallel and separate;
   wherein the first liquid valve is separated by a distance from the second liquid valve due to the separation of the pressure axis and the dispensing axis;
   wherein the second liquid valve is operated along or parallel to the pressure axis that is perpendicular relative to the axis.

13. The method of claim 12, wherein releasing the trigger further comprises delivering the liquid from the container through an auxiliary liquid aspiration duct formed within the container to a primary liquid aspiration duct to a secondary liquid aspiration duct adjacent the second liquid valve through a joining compartment that joins the primary and secondary liquid aspiration ducts that are axially offset.

14. The method of claim 12, separating an aspiration hole from the pressure chamber, when in the rest position, with a first seal of the piston and separated from an outside environment with a second seal of the piston and wherein in the dispensing position the aspiration hole is separated from the pressure chamber.

15. The method of claim 14, wherein upon initially releasing the trigger, the aspiration hole is in communication with the outside environment until the piston reaches the rest position.

16. A method for dispensing a liquid from a container, comprising:

positioning a piston in a pressure chamber having a liquid in a rest position, wherein in the rest position an aspiration hole is separated from the pressure chamber with a first seal of the piston and separated from an outside environment exterior to the container with a second seal of the piston and a first liquid valve is closed, wherein the pressure chamber defines a pressure axis;

providing a trigger to be actuated to move the piston to a dispensing position, wherein the aspiration hole is separated from the pressure chamber and the first liquid valve is opened to deliver the liquid from the pressure chamber to a dispenser duct to enable dispensing of the liquid through a nozzle, wherein the dispenser duct defines a dispensing axis;

providing the trigger to be released and the piston moves to the rest position, wherein upon releasing the trigger and the piston moving to the rest position a negative pressure is formed in the pressure chamber and at least one of (i) the first liquid valve closes, (ii) a second liquid valve opens to allow a liquid from the container to be moved into the pressure chamber, and (iii) allows the aspiration hole to be in communication with the outside environment so that air from the outside environment can be aspirated into the container; and providing the pressure axis to be parallel and separate from the dispensing axis;

wherein the second liquid valve is formed about the pressure axis and the first liquid valve is formed about the dispensing axis;

wherein actuating the trigger to position the piston in the dispensing position, the aspiration hole is separated from the pressure chamber with the first seal and the second seal and open to the outside environment.

17. A method for dispensing a liquid from a container, comprising:

position a piston in a pressure chamber having a liquid in a rest position, wherein in the rest position an aspiration hole is separated from the pressure chamber with a first seal of the piston and separated from an outside environment exterior to the container with a second seal of the piston and a first liquid valve is closed, wherein the pressure chamber defines a pressure axis;

providing a trigger to be actuated to move the piston to a dispensing position, wherein the aspiration hole is separated from the pressure chamber and the first liquid valve is opened to deliver the liquid from the pressure chamber to a dispenser duct to enable dispensing of the liquid through a nozzle, wherein the dispenser duct defines a dispensing axis;

providing the trigger to be released and piston moves to the rest position, wherein upon releasing the trigger and the piston moving to the rest position a negative pressure is formed in the pressure chamber and at least one of (i) the first liquid valve closes, (ii) a second liquid valve opens to allow a liquid from the container to be moved into the pressure chamber, and (iii) allows the aspiration hole to be in communication with the outside environment so that air from the outside environment can be aspirated into the container; and providing the pressure axis to be parallel and separate from the dispensing axis;

wherein the second liquid valve is formed about the pressure axis and the first liquid valve is formed about the dispensing axis;

wherein upon releasing the trigger to return the piston to the rest position, the negative pressure delivers the liquid in the container into the pressure chamber through a liquid aspiration duct and the second liquid valve and the aspiration hole aspirates air into the container through an air aspiration duct that is fluidically separated from the liquid aspiration duct in a joining compartment that joins a primary liquid aspiration duct with a secondary liquid aspiration duct.

18. A method for dispensing a liquid from a container having a piston coupled to a trigger and positioned in a pressure chamber, comprising:

providing the trigger to slidably move the piston along a pressure axis in the pressure chamber to a dispensing position, wherein liquid in the pressure chamber becomes pressurized upon slidably moving the piston to open a first liquid valve to deliver the liquid to a dispensing duct to dispense the liquid through a nozzle while an air aspiration hole is separated from the pressure chamber and in communication with an outside environment in a limit dispensing position so that air can be aspirated into the container through the air aspiration hole, wherein the dispensing duct defines a dispensing axis;

providing the trigger to be released and allow the piston to slidably return along the pressure axis in the pressure chamber to a rest position, wherein a negative pressure formed in the pressure chamber closes the first liquid valve and opens a second liquid valve to deliver liquid from the container into the pressure chamber through a liquid aspiration port and the second liquid valve, wherein in the rest position, the air aspiration hole is separated from the pressure chamber with a first seal of the piston and separated from the outside environment with a second seal of the piston;

providing the pressure axis separate from the dispensing axis;

wherein the second liquid valve is formed about the pressure axis and the first liquid valve is formed about the dispensing axis;

wherein releasing the trigger further comprises delivering the liquid from the container through an auxiliary liquid aspiration duct formed within the container to a primary liquid aspiration duct to a secondary liquid aspiration duct adjacent the second liquid valve through a joining compartment that joins the primary and secondary liquid aspiration ducts that are axially offset.

* * * * *

UNITED STATES PATENT AND TRADEMARK OFFICE
CERTIFICATE OF CORRECTION

PATENT NO. : 11,571,703 B2  
APPLICATION NO. : 15/925137  
DATED : February 7, 2023  
INVENTOR(S) : Riccardo Alluigi et al.

Page 1 of 2

It is certified that error appears in the above-identified patent and that said Letters Patent is hereby corrected as shown below:

On the Title Page

Column 1, Related U.S. Application Data, Line 1, Delete "(60)" and insert --(62)-- therefor Column 1, item (30) Foreign Application Priority Data, Line 1, Delete "(WO)" and insert --(IT)-- therefor In the Specification Column 3, Detailed Description, Line 17, Delete "26 '(for" and insert --26' (for-- therefor Column 3, Detailed Description, Line 17, After "1A", insert --,--

Column 3, Detailed Description, Line 19, Delete "26 "(for" and insert --26" (for-- therefor Column 3, Detailed Description, Line 53, After "1A", insert --,--

Column 3, Detailed Description, Line 54, After "1B", insert --,--

Column 4, Detailed Description, Line 9, Delete "26 'from" and insert --26' from-- therefor Column 4, Detailed Description, Line 10, Delete "26 "illustrated" and insert --26" (illustrated-- therefor Column 6, Detailed Description, Line 17, Delete "(PEND)." and insert --(PEHD).-- therefor Signed and Sealed this  
Twenty-sixth Day of September, 2023

Katherine Kelly Vidal  
*Director of the United States Patent and Trademark Office*

In the Claims

Column 9, Line 46, In Claim 17, delete "position" and insert --positioning-- therefor Column 9, Line 60, In Claim 17, before "piston", insert --the--